(12) United States Patent
Cheng et al.

(10) Patent No.: US 7,650,644 B2
(45) Date of Patent: Jan. 19, 2010

(54) OBJECT-BASED ACCESS CONTROL

(75) Inventors: Tom Cheng, Fremont, CA (US); Malte Christian Kaufmann, Walldorf (DE); Amit Nagar, Milpitas, CA (US)

(73) Assignee: SAP Aktiengesellschaft, Walldorf (DE)

( * ) Notice: Subject to any disclaimer, the term of this patent is extended or adjusted under 35 U.S.C. 154(b) by 806 days.

(21) Appl. No.: 10/720,447

(22) Filed: Nov. 25, 2003

(65) Prior Publication Data

US 2005/0114661 A1 May 26, 2005

(51) Int. Cl.
*G06F 17/00* (2006.01)
(52) U.S. Cl. .............................. 726/27; 726/28; 726/30; 705/2; 705/3; 707/9
(58) Field of Classification Search .................. 707/9, 707/10; 726/1, 2, 21, 27, 28, 30; 705/51, 705/2, 3
See application file for complete search history.

(56) References Cited

U.S. PATENT DOCUMENTS

| 6,457,130 | B2 * | 9/2002 | Hitz et al. ..................... 726/27 |
| 6,470,339 | B1 | 10/2002 | Karp et al. |
| 6,470,353 | B1 | 10/2002 | Yaung et al. |
| 6,484,258 | B1 | 11/2002 | Haverty |
| 6,513,039 | B1 | 1/2003 | Kraenzel |
| 6,535,879 | B1 | 3/2003 | Behera |
| 6,539,380 | B1 | 3/2003 | Moran |
| 6,578,037 | B1 | 6/2003 | Wong et al. |
| 6,591,265 | B1 | 7/2003 | Erickson et al. |

FOREIGN PATENT DOCUMENTS

EP 0 992 873 A2 * 4/2000

OTHER PUBLICATIONS

Lockhart, H. (ed.), "OASIS XACML Implementers Guide," Organization for the Advancement of Structure Information Standards (OASIS), Mar. 11, 2003, 5 pages.
Moses, T. (ed.), "OASIS Web-Services Policy Language Use-Cases and Requirements,"—Organization for the Advancement of Structure Information Standards (OASIS), Apr. 16, 2003, 23 pages.
Godik, S. and Moses, T. (eds.), "OASIS extensible Access Control Markup Language (XACML) Version 1.0)," Organization for the Advancement of Structure Information Standards (OASIS), Feb. 18, 2003, 132 pages.

* cited by examiner

*Primary Examiner*—Kimyen Vu
*Assistant Examiner*—Edward Zee
(74) *Attorney, Agent, or Firm*—Fish & Richardson P.C.

(57) ABSTRACT

Techniques are described for using permission data objects to control user access to business data objects. A permission data object identifies a group affiliation associated with a user and a business object type (or family of business data objects) to which the permission object controls access. A permission object includes a permission attribute and a permission value. A user who has the group affiliation that is identified in the permission object is permitted to access a particular business data object of the business object type when the value of the permission attribute in the permission data object is consistent with the value of a corresponding attribute in the particular business data object to which the user seeks access.

15 Claims, 6 Drawing Sheets

OBJECT-BASED ACCESS CONTROL

TECHNICAL FIELD

This description relates to controlling access to data in a computer system.

BACKGROUND

Computer systems often are used to manage and process business data. To do so, a business enterprise may use various application programs running on one or more computer systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. A business enterprise often may have a large volume of data and a large number of users who access data to process business transactions or to analyze data.

It may not be desirable for all users of a computer system to have access to all data in a computer system. This may be particularly true when a computer system has a large number of users, a large volume of data, or both a large number of users and a large volume of data. This also may be particularly true when a computer system is accessible to users or other computer systems over a private or public network.

One approach to preventing access to some portions of data by some users while permitting access to the portions of data by other users is to assign to particular users access privileges to particular portions of data. An access control list may be used to identify the particular users that are permitted access to particular portions of data. Creating and updating an access control list so that the access control list accurately provides access to the appropriate portions of data to the appropriate users may be a burdensome and time-consuming process. One approach to reducing the burden of managing access control information is to use an access control list that provides users access to particular portions of data based on a user attribute that is shared by many users (rather than basing access on a user identifier that is unique to each user).

SUMMARY

Generally, the invention uses permission data objects to control user access to business data objects. A permission data object identifies a group affiliation associated with a user and a business object type (or family of business data objects) to which the permission object controls access. A permission object includes a permission attribute and a permission value. A user who has the group affiliation that is identified in the permission object is permitted to access a particular business data object of the business object type when the value of the permission attribute in the permission data object is consistent with the value of a corresponding attribute in the particular business data object to which the user seeks access.

In one general aspect, a determination is made as to whether a user is permitted to access a business object when executing a software application of an enterprise information technology system. More particularly, a permission object is used to determine whether a user associated with an entry in user information is permitted to access a data object associated with a data object type. The entry in the user information associates the user with a user affiliation. The permission object identifies a user affiliation to which the permission object applies and a data object type to which the permission object applies such that the data object type is associated with multiple attributes and each data object having the data object type is associated with the multiple attributes. The permission object also identifies a permission attribute identifying one of the multiple attributes, and a permission value for the permission attribute. The user is permitted to access the data object when (1) the user affiliation that is associated with the user is the same user affiliation as the user affiliation to which the permission object applies, (2) the data object type of the data object is the same data object type as the data object type to which the permission object applies, and (3) a value of an attribute of the multiple attributes associated with the data object is consistent with the permission value of the permission attribute and the attribute corresponds to the permission attribute.

Implementations may include one or more of the following features. For example, the user may be permitted to access the data object when the value of the attribute of one of the multiple attributes associated with the data object is the same as the permission value of the permission attribute. The user may be permitted to access the data object when the value of the attribute of one of the multiple attributes associated with the data object is the within a range specified by the permission value of the permission attribute. The user may be permitted to access the data object when the value of the attribute of one of the multiple attributes associated with the data object is one of enumerated values specified by the permission value of the permission attribute.

The permission object may identify an attribute group having one or more attributes of the multiple attributes associated with the data object type. In such a case, the user may be permitted to access an attribute of the data object only when the attribute of the data object corresponds to an attribute of the attribute group of the permission object.

The permission object also may identify a second attribute group having one or more attributes of the multiple attributes associated with the data object type, a second permission attribute identifying one of the multiple attributes, and a second permission value for the second permission attribute. The permission object may associate the second permission attribute and the second permission value with the second attribute group and may associate the permission attribute and permission value with the attribute group. In such a case, the user may be permitted to access an attribute of the data object only when the attribute of the data object corresponds to an attribute of the second attribute group of the permission object and a value of an attribute of one of the multiple attributes associated with the data object is consistent with the second permission value of the second permission attribute.

The permission object may identify a permitted action. If so, the user may be permitted to access the data object and perform an action on the data object when the action is consistent with the permitted action identified in the permission object.

The invention uses permission objects created at design time to control access to business data at runtime. In this way, the need for a predetermined access control list, and the corresponding human effort to keep the access control list current, is eliminated.

Implementations of the techniques discussed above may include a method or process, a system or apparatus, or computer software on a computer-accessible medium. The details of one or more implementations of the invention are set forth in the accompanying drawings and the description below.

Other features, objects, and advantages of the invention will be apparent from the description and drawings, and from the claims.

DETAILED DESCRIPTION

Figure 1:
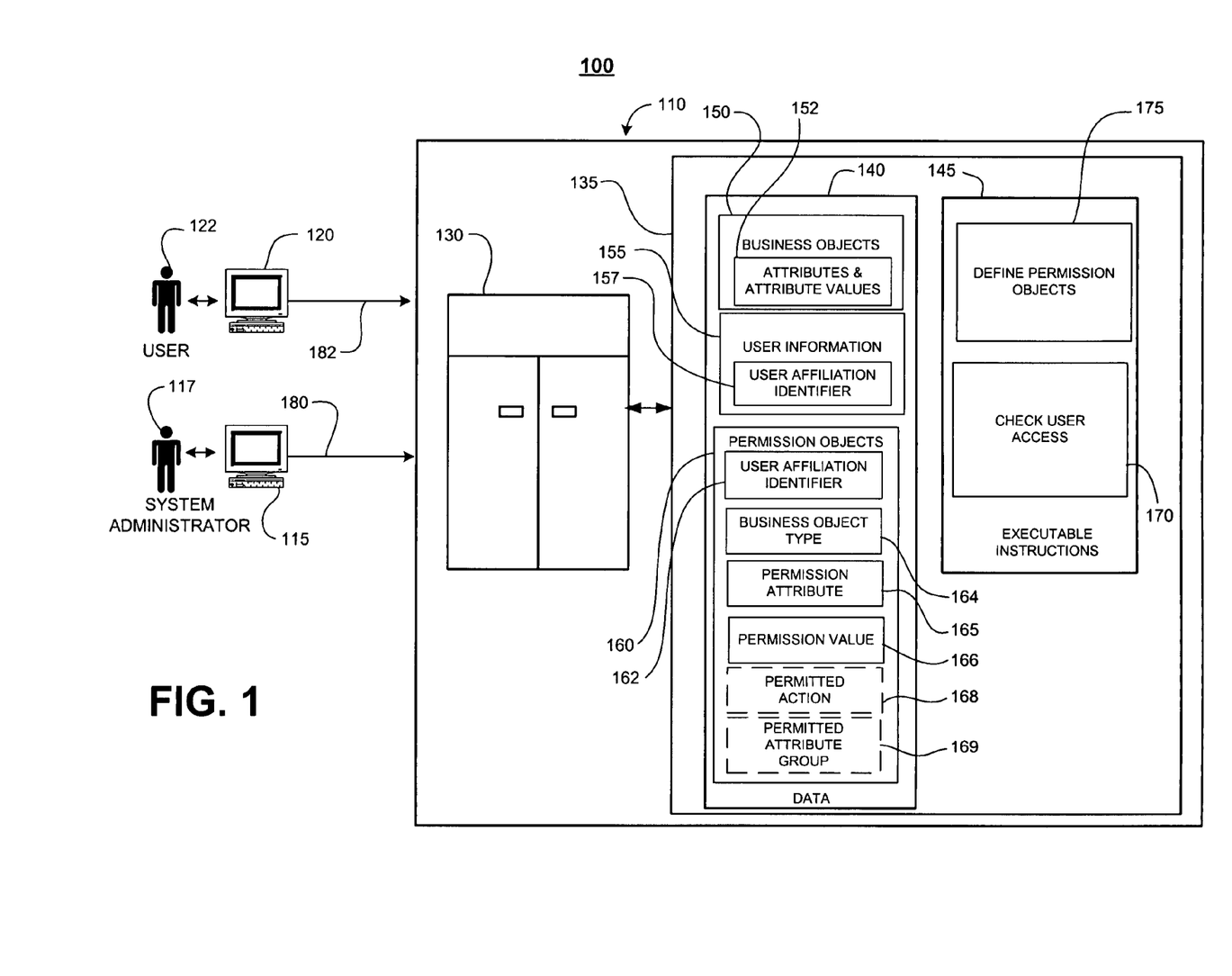
FIG. 1 is a block diagram of a system incorporating various aspects of the invention.

FIG. 1 shows a block diagram of a system 100 of networked computers that includes a computer system 110 for a business application. A user of the business application is permitted access to only a portion of the business data. The portion of the business data accessible to a user is based on the user's affiliation with a particular user group, function or role and permission data objects that identify the access permitted to a family of business data objects. A user who has the group affiliation that is identified in a permission object is permitted to access a particular business data object when the value of a permission attribute in the permission data object is consistent with the value of a corresponding attribute in the particular business data object to which access is sought. A data object may also be referred to as simply an "object."

The system 100 includes the computer system 110, a client computer 115 used by a system administrator 117 to define permission objects, and a client computer 120 used by a user 122 to use the business application and access business objects as permitted by the permission objects. The computer system 110, the client computer 115 and the client computer 120 all are capable of executing instructions on data. As is conventional, the computer system 110 includes a server 130 and a data storage device 135 that is associated with the server 130. The data storage device 135 includes data 140 and executable instructions 145. A particular portion of data, here referred to as business objects 150, is stored in the computer system 110. The business objects 150 includes multiple business objects, each of which is associated with a business object type. Each business object in business objects 150 is a collection of data attribute values, and typically is associated with a principal entity represented in a computing device or a computing system. Examples of a business object include information about a customer, an employee, a product, a business partner, a product, a sales invoice, and a sales order. A business object may be stored using a variety of techniques. A business object may be stored, for example, as a row in a relational database table, an object in an object-oriented database, data in an extensible mark-up language (XML) file, or a record in a data file. Attributes and attribute values 152 are associated directly or indirectly with each of the business objects 150. In one example, a customer business object may be associated with a series of attributes including a customer number uniquely identifying the customer, a first name, a last name, an electronic mail address, a mailing address, and a telephone number. An attribute is generally associated with a particular value but is not necessarily always associated with a particular value. In one example, a first name attribute may have a value of "Robert" or "Mary." In another example of different type of attributes, a sales order business object may include a customer number of the purchaser, the date on which the sales order was placed, and a list of products, services, or both products and services purchased.

The computer system 110 also stores another particular portion of data, here referred to as user information 155. Like the business data 150, the user information 155 includes multiple user data objects. Stored with the user information 155 is an identifier of an affiliation 157 to which the user is associated. The user affiliation identification may be, for example, a user group or role that is used to identify users who have common requirements and common authorization to access portions of the data 140.

The computer system 110 also stores permission objects 160. A permission object in the permission objects 160 includes a user affiliation identifier 162 that identifies a user affiliation to which the permission object applies. As described previously, a user affiliation may be a user group, a user role or another type of user classification that identifies users that have common requirements and common authorization to access portions of the data 140. A user affiliation identifier 162, for example, may be a user group name (or identifier) or a user role name (or identifier). A permission object in the permission objects 160 also includes a business object type 164 that identifies a type (or family or class) of business objects to which the permission object applies.

The permission object in the permission objects 160 also includes a permission attribute 165 and a permission value 166. A user who has a group affiliation that matches the user affiliation identifier 162 is permitted to access a particular business data object having a business object type that matches business object type 164 when the permission value 166 of the permission attribute 165 is consistent with the value of a corresponding attribute in the particular business data object to which access is sought. A permission value 166 may be, for example, a single value, a range of values or an enumeration. An enumeration of a permission value may identify particular characters that occur in particular portions of the value of the business object that corresponds to the permission attribute 165. For example, the permission value may identify three characters with which the value of the corresponding business object attribute must begin, or alternatively, must end. In another example, the permission value may identify characters that must occur in a particular location in the value of the corresponding business object attribute. This may be particularly useful when a particular portion of a character string in an attribute has special meaning. For example, in a global enterprise, the first three characters of an organizational unit attribute may represent a corporation or other type of business entity, the next two characters may represent a division of the corporation identified in the first three characters, and the last four characters of the organizational attribute may represent a cost center. In such a case, when the permission value for the organizational attribute identifies particular characters that must occur in the portion of the organizational unit attribute representing the division of the corporation, the permission value may be used to control access to business objects having an organization unit attribute. In such a case, access is permitted only when the business object includes the same characters in the same location in the corresponding attribute as the characters and location identified in the permission value 166—that is, when the business object includes, in the division portion of the organizational unit attribute, the same characters as identified in the permission value 166.

In some implementations, the permission attribute 165 also may be referred to as a dependent attribute. Also, in some implementations, the corresponding attribute may be directly or indirectly associated with the business object to which a user seeks access.

In one example, an attribute that corresponds to the permission attribute of the permission object is indirectly associated with the business object to which a user seeks access. In this example, the business object to which a user seeks access is of an object type that represents an employee. The employee object is associated with a series of attributes (such as first name, last name, and employee identification number) and also is associated with two dependent objects, each of which refers to the employee object. One of the dependent objects has an attribute for storing a phone number, and the other dependent object stores a work address having address attribute values, such as street address, city, state, zip code, and country. The corresponding attribute for the employee object to which the user seeks access may be the country attribute of one of the dependent objects to which the employee object relates.

Optionally, a permission object may include a permitted action 168 that defines an action or actions that may be taken by a user permitted access to the particular business data object. By way of example, permitted action 168 may include one or more of the database operations of read, write and delete. In another example, permitted action 168 also may include one or more actions of create, read, update and delete. A permission object also may include a permitted attribute group 169 that identifies a group of attributes in the business data object to which the user is permitted access. The group of attributes may be some or all of the attributes, directly or indirectly, included in the business data object, as described more fully below in FIGS. 4 and 5.

The computer system 110 includes a process 170 to check whether a particular user is permitted access to a particular business object. In general, the check user access process 170 identifies, based on an object type and a user affiliation, and accesses a permission object to use to determine whether a user is permitted to access a particular business object. This may be accomplished, for example, by searching for and accessing a permission object that has both a group affiliation identifier 162 that matches the user affiliation identifier 157 associated with the user who is seeking access to the particular business object and a business object type 164 that matches the business object type of the particular business data object to which the user seeks access. The process 170 then compares the permission value 166 of the permission attribute 165 with the value of a corresponding attribute in the particular business data object which the user seeks access. When the value of the corresponding attribute in the particular business data object is consistent with the permission value 166, the user is permitted to access the business data object. In some cases, the permission value 166 may be a range of values. In such a case, a user is permitted access when the value of the corresponding attribute in the particular business data object is within the range specified in permitted value 166.

Figure 6:
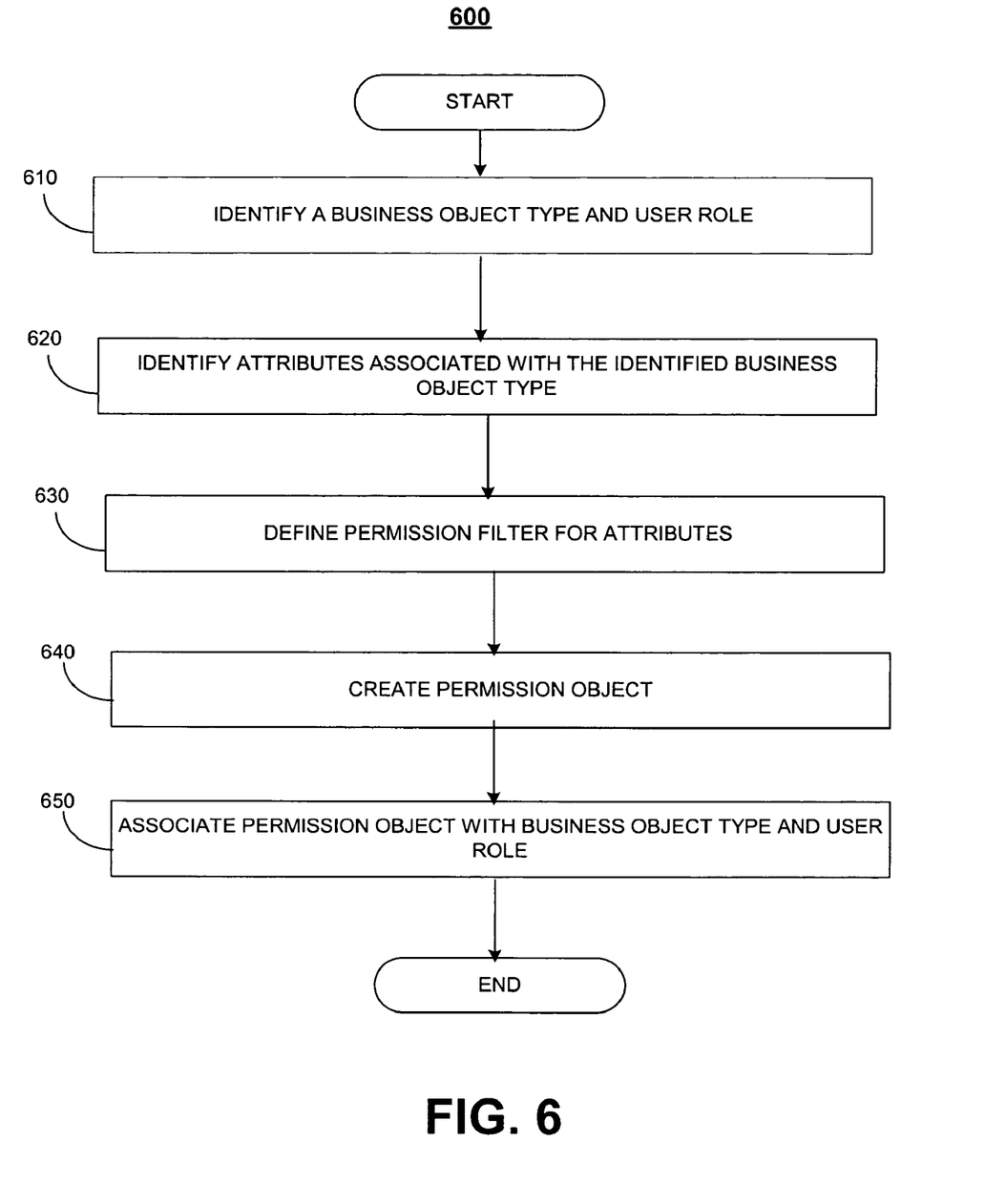
FIG. 6 is a flow chart of a process for defining a permission data object.

The computer system 110 also includes a process 175 for defining a permission object in permission objects 160, as described more fully with respect to FIG. 6. In general, a software developer or a system administrator, such as the system administrator 117, defines a permission object for use at runtime of executing application software.

Each of the processes 170 and 175 is implemented in an object-oriented programming language that defines data used with the processes as a series of object types (or classes) and processes that are associated with each object type. Each process may be referred to as a method.

The computer system 110 and the client computers 115 and 120 may be arranged to operate within or in concert with one or more other systems, such as, for example, one or more LANs ("Local Area Networks") and/or one or more WANs ("Wide Area Networks"). Each of the client computers 115 or 120 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). The client computer 115 uses a wired or wireless communication pathway 180 to communicate with the computer system 110, and the client computer 120 uses a wired or wireless communication pathway 182 to communicate with the computer system 110. For brevity, FIG. 1 illustrates only a single system administrator computer 115 and a single user computer 120 for system 100.

Figure 2:
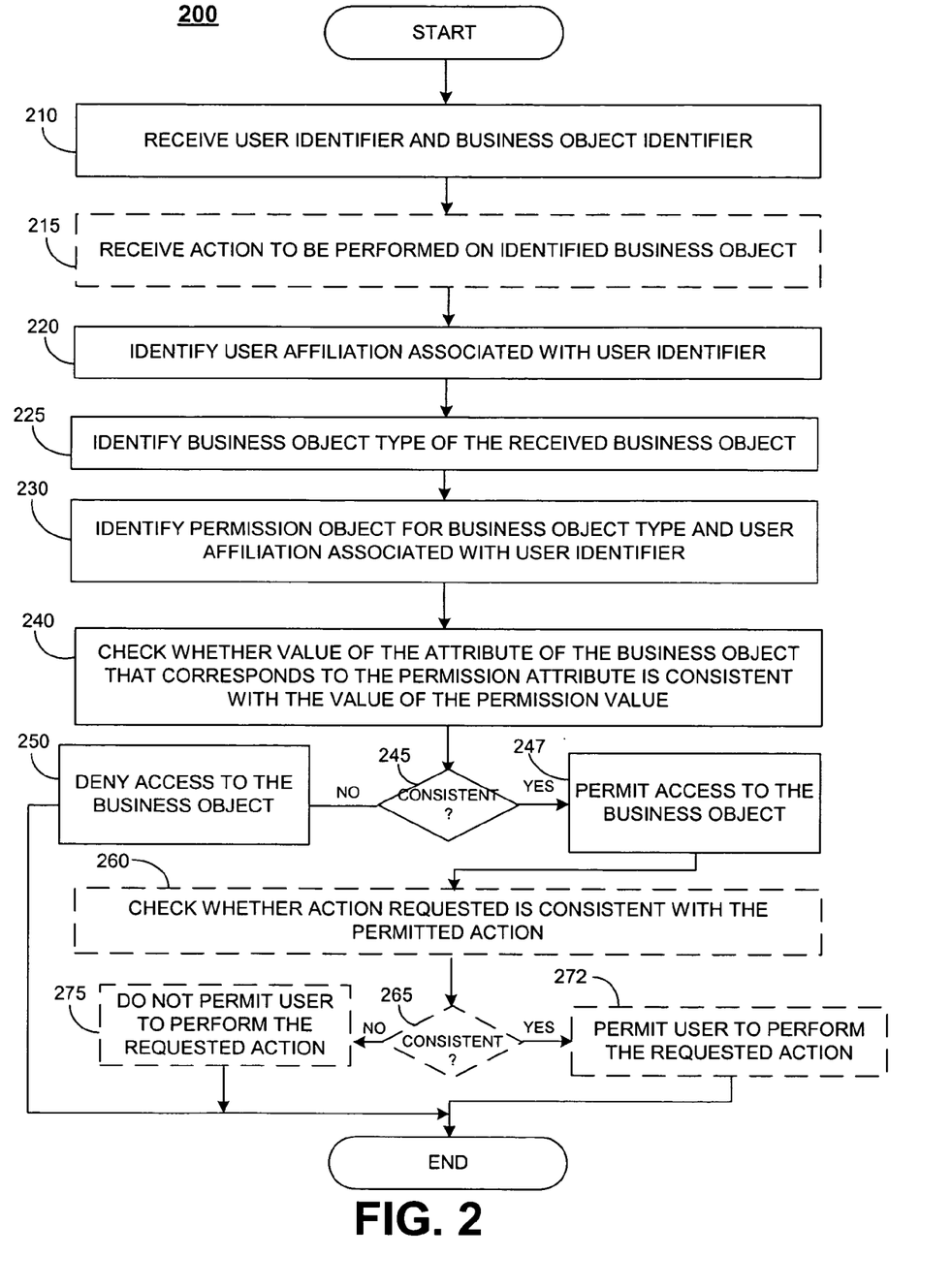
FIG. 2 is a flow chart of a process for using permission objects to determine whether a particular user is permitted to access a particular business object.

FIG. 2 depicts an example process 200 that uses permission objects to check whether a user is permitted to access a particular business object. The process 200 may be performed by a processor on a computing system, such as the computer system 110 of FIG. 1. The processor is directed by a method, script, or other type of computer program that includes executable instructions for performing the check user access process 200. An example of such a collection of executable instructions is the check user access process 170 of FIG. 1.

The process 200 may be initiated by another software module or other type of executable software when a user using a user interface of an application seeks to access a particular business object. The processor receives a user identifier and a business object identifier (step 210). This may be accomplished, for example, when the computer program that initiates the check access control process 200 provides a user identifier and a business object identifier to the processor when the check user access process 200 is initiated. Optionally, the processor also receives an action to be performed by the user on the identified business object (step 215). In some cases, a received action may include multiple actions. In one example, the received action may include both a read operation and a write operation or may include a read operation, a write operation and a delete operation.

The processor identifies a user affiliation identifier that is associated with the user identifier received (step 220). This may be accomplished, using the computer system 110 in FIG. 1 as an example, by searching in user information 155 to identify a record with a value of the user affiliation 162 that matches the received user identifier. In addition, the processor identifies a business object type associated with the received business object (step 225). This may be accomplished, for example, by accessing the business object to determine a business object type that is associated to the business object to which the user seeks access.

The processor then identifies a permission object that is applicable to both the identified user affiliation and the identified business object type (step 230). This may be accomplished, using the computer system 110 as an example, by searching the permission objects 160 to identify a permission object that includes both the identified user affiliation identifier 162 and the identified business object type 164 if the processor does not find a permission object applicable to both the user affiliation and business object type, the process 200 ends (not shown).

The process checks whether the value of the attribute of the business object that corresponds to the permission attribute of the permission object is consistent with the value of the permission value (step 240). For example, the value of the business object attribute is consistent when the business object value matches the value of the permission value, when the business object value is within a range of values of the permission value, when the business object value is one of several enumerated values included in the permission value, or when the value is equal to a value determined when the processor evaluates an expression that is included in the permission value.

When the value of the attribute of the business object that corresponds to the permission attribute is consistent with the value of the permission value (steps 240 and 245), the processor permits access to the business object (step 247). When the value of the attribute of the business object that corresponds to the permission attribute is not consistent with the value of the permission value (steps 240 and 245), the processor does not permit access to the business object. The processor, for example, may return to a calling program an indication whether the user is permitted access to the business object.

When an action is received (step 215), the processor also determines whether the requested action is consistent with the permitted action of the permission object (step 260). If the requested action is consistent (step 265), the processor permits the user to perform the requested action (step 272). If the requested action is not consistent (step 265), the processor does not permit the user to perform the requested action (step 275). The processor, for example, may return to a calling program an indication whether the user is permitted perform the requested action on the business object.

In some implementations, a process to check user access may receive a user affiliation and a business object type. In such a case, the processor, having received a user affiliation, need not identify a user affiliation associated with a user identifier (step 220). Neither does the processor need to identify a business object type (step 225) when a processor has been provided with the business object type.

Figure 3:
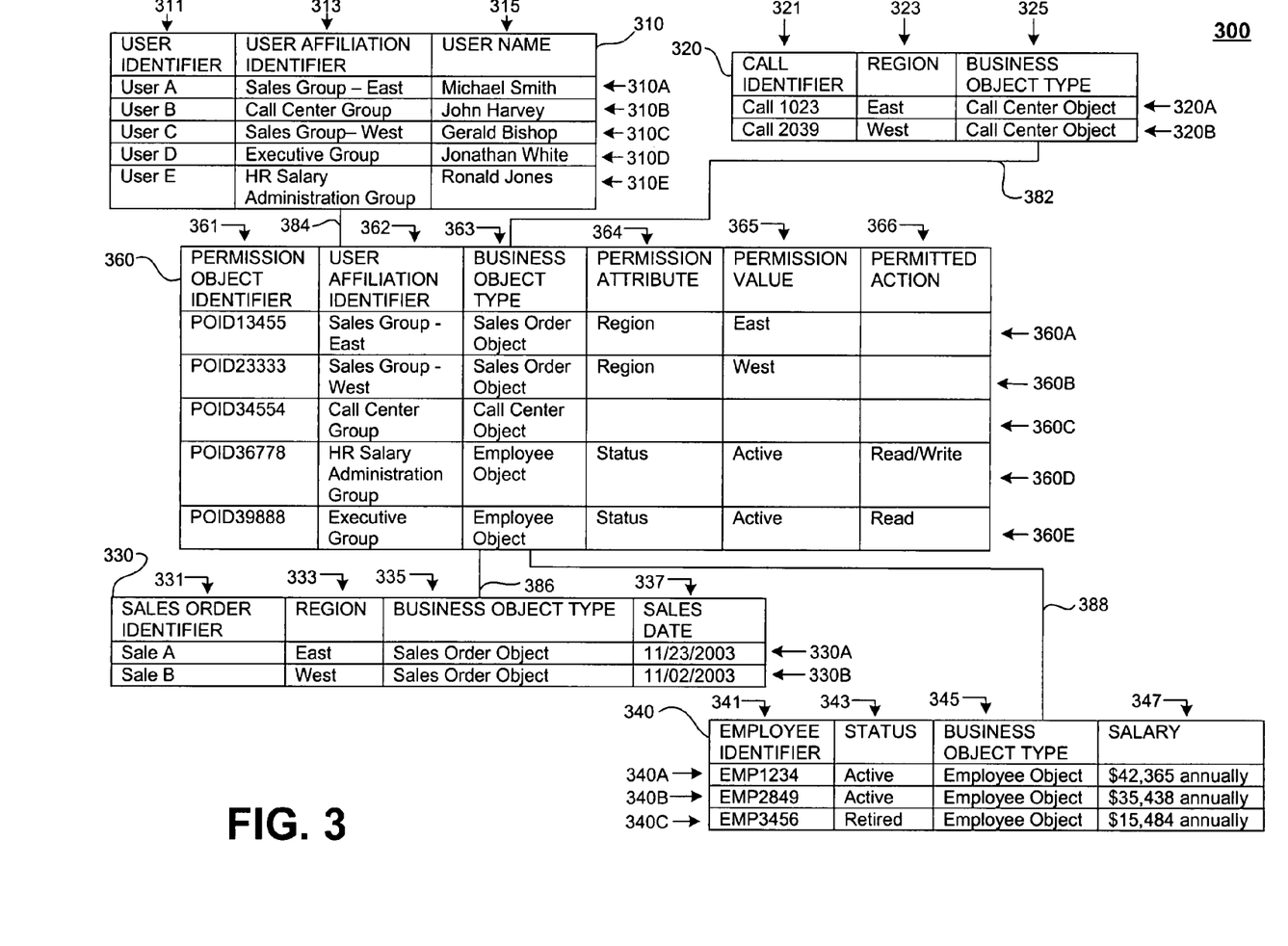
FIGS. 3 and 4 are block diagrams of representations of example permission objects, user information, and business objects.

Referring to FIG. 3, a representation 300 of user information 310, business objects 320, 330 and 340 of different types, and permission objects stored in a permission object table 360 is shown, in simplified form, to illustrate the use of permission data objects to control user access to business data objects. The representation 300 is stored in a relational database system that logically organizes data into database tables in which each table includes a series of columns and rows. Each column represents an attribute and each row represents a collection of attribute values.

The user information 310 may be, for example, an implementation of user information 155 in FIG. 1. The user information 310 arranges data associated with a user into a series of columns 311, 313 and 315 and rows 310A-310E. Each column 311, 313 and 315 describes an attribute of a user for which data is being stored. Each row 310A-310E represents a collection of attribute values for the particular user identifiable by a user identifier 311 that uniquely identifies information associated with the particular user. The attributes include a user affiliation identifier 313 that is associated with a particular user and a user name 315 of the particular user.

The business object 320 is a call center table that stores one of the illustrated types of business objects and arranges data associated with a request for help received by a call center into a series of columns 321, 323 and 325 and rows 320A and 320B. Each column 321, 323 and 325 describes an attribute of a help request for which data is being stored. Each row 320A and 320B represents a collection of attribute values for a particular help request identifiable by a call identifier 321. The attributes include a region 323 that identifies one of several geographical regions from which the help request originated and a business object type 325 that identifies the rows 320A-320B as being associated with the call center object family.

The business object 330 is a sales order table that stores one of the illustrated types of business objects and arranges data associated with a sales order into a series of columns 331, 333, 335 and 337 and rows 330A and 330B. Each column 331, 333, 335 and 337 describes an attribute of a sales order for which data is being stored. Each row 330A and 330B represents a collection of attribute values for a particular sales order identifiable by a sales order identifier 331. The attributes include a region 333 that identifies one of several geographical regions from which the sales order originated, a business object type 335 that identifies the rows 330A-330B as being associated with the sales order object family, and a sales date 337 that identifies the date on which the sale occurred.

The business object 340 is a employee table that stores one of the illustrated types of business objects and arranges data associated with an employee into a series of columns 341, 343, 345 and 347 and rows 340A-340C. Each column 341, 343, 345 and 347 describes an attribute of an employee for which data is being stored. Each row 340A-340C represents a collection of attribute values for a particular employee identifiable by an employee identifier 341. The attributes include a status 343 that identifies one of several possible conditions that describes an employee relation to the employing business entity. In this example, a status 343 may be one of active or retired. The attributes also include a business object type 345 that identifies the rows 340A-340C as being associated with the employee object family, and a salary 347 being paid to the employee.

The permission object table 360 arranges data associated with permission objects into a series of columns 361-366 and rows 360A-360E. Each column of columns 361-366 describes an attribute of a permission object for which data is being stored. Each row 360A-360E represents a collection of attribute values for a particular permission object identifiable by a permission object identifier 361. The attributes include a user affiliation identifier 362 that identifies a user affiliation to which the permission object applies, and a business object type 363 that identifies a type of business object to which the particular permission object applies. The attributes also include a permission attribute 364, a permission value 365 and a permitted action 366, such as the corresponding items 165, 166 and 168 in FIG. 1.

In one example using the representation 300 to illustrate the process 200 in FIG. 2, a computer program capable of executing the process 200 is initiated and passed the parameters of a user identifier having a value of "User B" and a call center object identifier having a value of "Call 1023." In this way, the processor executing the computer program receives the user identifier and the business object identifier (step 210).

The processor, using user information table 310 to find a row that has a user identifier 311 having a value of "User B," determines that the received user identifier value "User B" is associated with a user affiliation identifier 313 having a value of "Call Center Group" in row 310B (step 220). The processor, using a call center object table 320, determines that the call center identifier 321 having the received value of "Call 1023" is associated with a business object type 325 having a value of "Call Center Object" in row 320A (step 225).

The processor uses the permission object table 360 to identify a permission object row having the identified business object type (here, the call center object type), as illustrated by link 382, and the identified user affiliation (here, the "Call Center Group"), as illustrated by link 384 (step 230). To do so, the processor identifies a row in the permission object table 360 that has a corresponding value for the business object type 363 and a corresponding value for the user affiliation identifier 362. Here, the processor identifies permission object row 360C that has a user affiliation 362 having a value of "Call Center Group" and a business object type 363 having a value of "Call Center Object."

The processor checks whether the value of the attribute of the call center object that corresponds to the permission attribute 364 is consistent with the value of the permission value 365 (step 240). Here, the permission attribute 364 for the permission object row 360C is blank, which indicates, in this example, that any user associated with the user affiliation identifier "Call Center Group" is permitted to access to any call center object. In other words, the permission object row 360C indicates that the specified user affiliation identifier "Call Center Group" is permitted access to all call center objects, and, because, there are no other permission objects that identify the call center object, only users associated with the call center group are permitted access to the call center objects. Accordingly, the processor determines that the business object row 320A is consistent with the permission object row 360C (step 245) and permits the user associated with the user identifier 311 having the value of "User B" to access the call center object row 320A (step 247). To do so, the computer program returns to the calling program an indication that the user is permitted access.

In another example using the representation 300 to illustrate the process 200 in FIG. 2, a computer program capable of executing the process 200 is initiated and passed the parameters of a user identifier having a value of "User A" and a sales order object identifier having a value of "Sale A." In this way, the processor executing the computer program receives the user identifier and the business object identifier (step 210).

The processor, using user information table 310 to find a row that has a user identifier 311 having a value of "User A," determines that the received user identifier value "User A" is associated with a user affiliation identifier 313 having a value of "Sales Group-East" in row 310A (step 220). The processor, using the sales order object table 320, determines that the sales order identifier 321 having the received value of "Sale A" is associated with a business object type 325 having a value of "Sales Order Object" in row 330A (step 325).

The processor uses the permission object table 360 to identify a permission object row having the identified business object type (here, the sales order object type), as illustrated by link 386, and the identified user affiliation (here, the "Sales Group-East"), as illustrated by link 382 (step 230). To do so, the processor identifies a row in the permission object table 360 that has a corresponding value for the business object type 363 and a corresponding value for the user affiliation identifier 362. Here, the processor identifies permission object row 360A that has a user affiliation 362 having a value of "Sales Group-East" and a business object type 363 having a value of "Sales Order Object."

The processor checks whether the value of the attribute of the sales order object that corresponds to the permission attribute 364 is consistent with the value of the permission value 365 (step 240). Here, the permission attribute 364 for the permission object row 360A has a value of "Region" and the permission value 365 has a value of "East." The processor determines that the business object to which the user seeks access (here, sales order object row 330A) has a value of "East" for the region attribute 333, which matches the permission value 365 of the permission object row 360A. In this way, the processor determines that the business object row 330A is consistent with the permission object row 360A (step 245) and permits the user associated with the user identifier 311 having a value of "User A" to access the sales order object row 330A (step 247). To do so, the computer program returns to the calling program an indication that the user is permitted access.

In contrast, when the user associated with the user identifier 311 having a value of "User C" seeks to access the sales order object row 330A, the processor determines that the user is not permitted and denies access (step 250). This is because, according to row 310C of the user information table 310, the user is associated with the "Sales Group—West." A user having such an affiliation is only permitted to access a sales order object in table 330 having a value of "West" for the Region attribute 333, according to the permission object row 360B of the permission object table 360. Because the sales order object row 330A, to which the user seeks access, has a value of "East" for the region attribute 333, the processor denies the user access (step 250). To do so, the computer program returns to the calling program an indication that the user is not permitted access.

In yet another example using the representation 300 to illustrate the process 200 in FIG. 2, a computer program capable of executing the process 200 is initiated and passed the parameters of a user identifier having a value of "User E," an employee object identifier having a value of "EMP1234," and a requested action having a value of "Read/Write." In this way, the processor executing the computer program receives the user identifier and the business object identifier (step 210), as well as an action to be performed on the identified business object (step 215).

The processor, using user information table 310 to find a row that has a user identifier 311 having a value of "User E," determines that the received user identifier value "User E" is associated with a user affiliation identifier 313 having a value of "HR Salary Administration Group" in row 310E (step 220). The processor, using the employee object table 340, determines that the employee identifier 341 having the received value of "EMP1234" is associated with a business object type 345 having a value of "Employee Object" in row 340A (step 225).

The processor uses the permission object table 360 to identify a permission object row having the identified business object type (here, the employee object type), as illustrated by link 388, and the identified user affiliation (here, the "HR Salary Administration Group"), as illustrated by link 384 (step 230). To do so, the processor identifies a row in the permission object table 360 that has a corresponding value for the business object type 363 and a corresponding value for the user affiliation identifier 362. Here, the processor identifies permission object row 360D that has a user affiliation 362 having a value of "HR Salary Administration Group" and a business object type 363 having a value of "Employee Object."

The processor checks whether the value of the attribute of the employee object that corresponds to the permission attribute 364 is consistent with the value of the permission value 365 (step 240). Here, the permission attribute 364 for the permission object row 360D has a value of "Status" and the permission value 365 has a value of "Active." The processor determines that the business object to which the user seeks access (here, employee object row 340A) has a value of "Active" for the status attribute 343, which matches the permission value 365 of the permission object row 360D. In this way, the processor determines that the business object row 340A is consistent with the permission object row 360D (step 245) and permits the user associated with the user identifier 311 having a value of "User E" to access the employee object row 340A (step 247).

In this example, a requested action having a value of "Read/Write" also has been passed to the computer program, and so, the processor also determines whether the action requested is consistent with the permitted action of the permission object (step 260). To do so, the processor compares the value of the permitted action attribute 366 of the permission object row 360D (which was previously identified in step 230) with the value of the requested action received in step 215. Here, the value of the permitted action attribute 366 is "Read/Write," as is the value of the requested action received in step 215. The processor permits the user associated with the user identifier 311 having a value of "User E" to perform the requested action on the employee object row 340A (step 272). To do so, the computer program returns to the calling program an indication that the user is permitted to perform the requested action on the business object.

In contrast, when the user associated with user identifier 311 having a value of "User D" seeks to access the employee object row 340A to perform a "Read/Write" requested action, the processor determines that the user is not permitted to perform the requested action (step 275). This is because, according to row 310D of the user information table 310, the user is associated with the "Executive Group." A user having such an affiliation is only permitted to perform a "Read" action on an employee object in table 340 having a value of "Active" for the Status attribute 343, according to the permission object row 360E of the permission object table 360. To do so, the computer program returns to the calling program an indication that the user is not permitted to perform the requested action.

When either the user associated with the user identifier 311 having a value of "User D" or the user associated with the user identifier 311 having a value of "User E" seeks to access the employee object row 340C, the processor determines that the user is not permitted to access the employee object (step 250). This is because, according to row 340C of the employee object table 340, the status attribute 343 has a value of "Retired" which does not correspond to the value of "Active" of the permission value 365 of either of the permission object rows 360D and 360E. Accordingly, the computer program returns to the calling program an indication that the user is not permitted to access the employee object (step 250).

Figure 4:
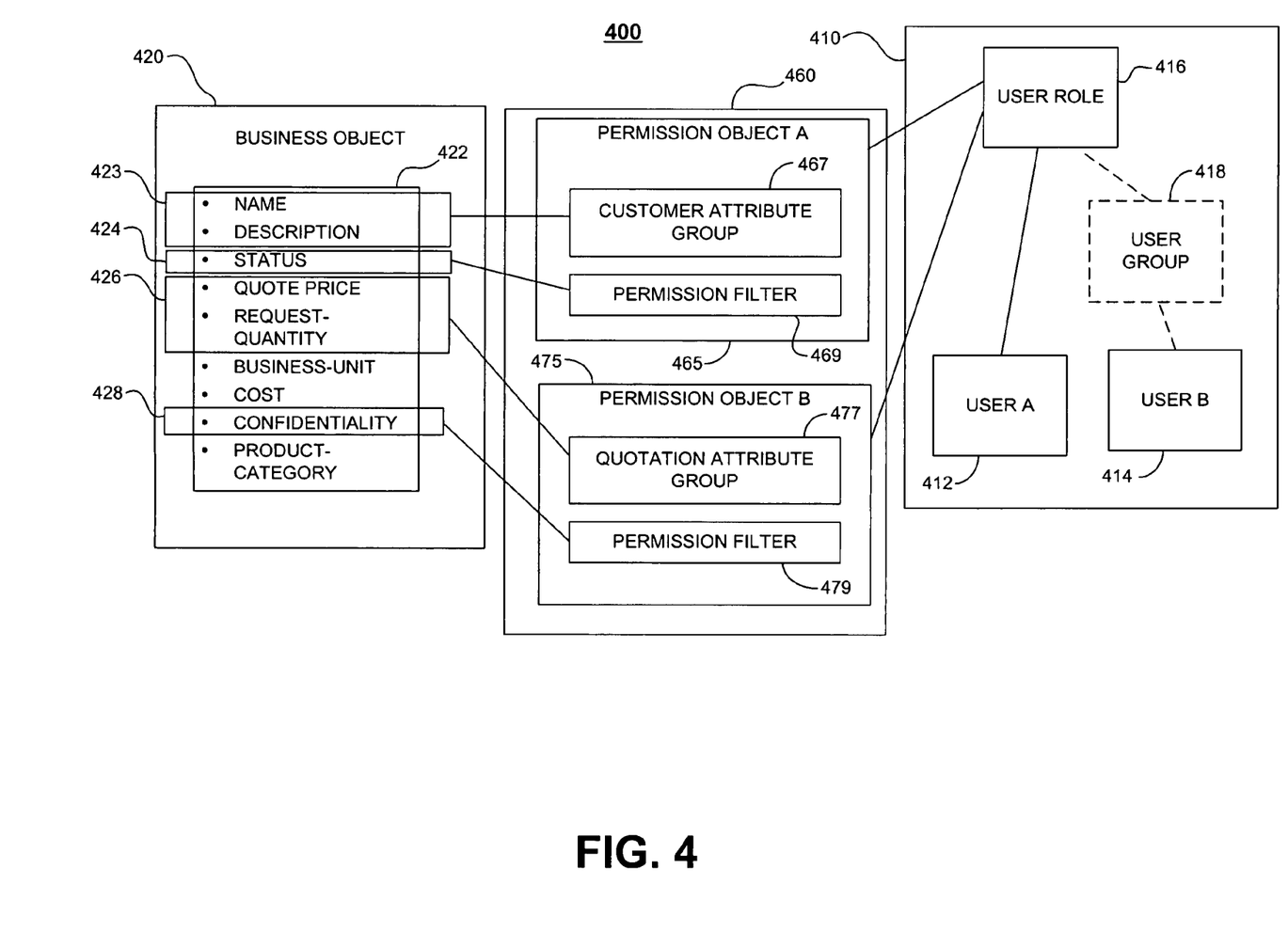

FIG. 4 illustrates another example of a representation 400 of user information 410, a business object 420, and permission objects 460 is shown, in simplified form, to illustrate the use of permission data objects 465 and 475 to control access of users 412 and 414 to business object 420. In general and in contrast to the data representation 300 in FIG. 3, the permission objects 460 are used to control access of users 412 and 414 to groups of attributes in the business object 420, rather than access to all attributes of the business object, as illustrated in FIG. 3. Also, the user information 410 is more structured than the user information 310 in FIG. 3.

More specifically, in contrast to the data representation 300 in FIG. 3, the user information 410 includes a user role 416 with which each of users 412 and 414 are directly or indirectly related. User 412 is directly related to the user role 416, whereas user 414 is indirectly related to the user role 416 through an optional user group 418. In the example of the representation 400, the optional user group 418 is an aggregation of users and is represents a finer granularity of a collection of users than the user role 416 to which each user is related, directly or indirectly. The user group 418 is associated with the user role 416. For brevity, only one user role, one user group, and two users are shown. The user role 416 is related to each of the permission objects 465 and 475. In some implementations, a permission object may be related, additionally or alternatively, to a user group, such as user group 418.

Also in contrast to the data representation 300 in FIG. 3, each of the permission objects 465 and 470 includes an attribute group 467 or 477 and a permission filter 469 or 479. The attribute group 467 indicates the attributes 423 of the business object attributes 422 to which access is controlled through the permission object 465. Similarly, the attribute group 477 indicates the attributes 426 of the business object attributes 422 to which access is controlled through the permission object 475.

Each of the permission filters 469 or 479 is associated with an attribute group 467 or 477. A permission filter 469 or 479 represents one or more combinations of a permission attribute and a permission value that may be used, as previously described, to determine whether a particular user is permitted to access the attribute group 467 or 477 of the permission object 465 or 475, respectively. Each of the permission filters 469 or 479 is associated with attributes 424 or 428 of the business object 420. As described previously, when the value of the attribute 424 or 428 is consistent with the permission value of the permission filter 469 or 479, a user 412 or 414, who is associated with the user role 416 to which the permission object 465 or 475 relates, is permitted to access the attributes 423 or 426. More particularly, in this example, a user 412 or 414, both of whom are associated with the user role 416 to which the permission objects 465 and 475 are related, is permitted to access the attributes 423 when the value of the status attribute 424 is consistent with the value of the permission value included in the permission filter 469. Because a user is permitted by the permission object to access any of the attributes in the business object that correspond to attributes identified in the attribute group, it is not necessary to check separately whether a user is permitted to access each of the attributes identified in the attribute group. The performance of a check access process may be improved when only access to one of the attributes in the attribute group is checked at runtime, rather than checking whether access is permitted to multiple attributes in the attribute group. Likewise, a user 412 or 414 is permitted to access the attributes 426 when the value of the confidentially attribute 428 is consistent with the value of the permission value included in the permission filter 479.

Figure 5:
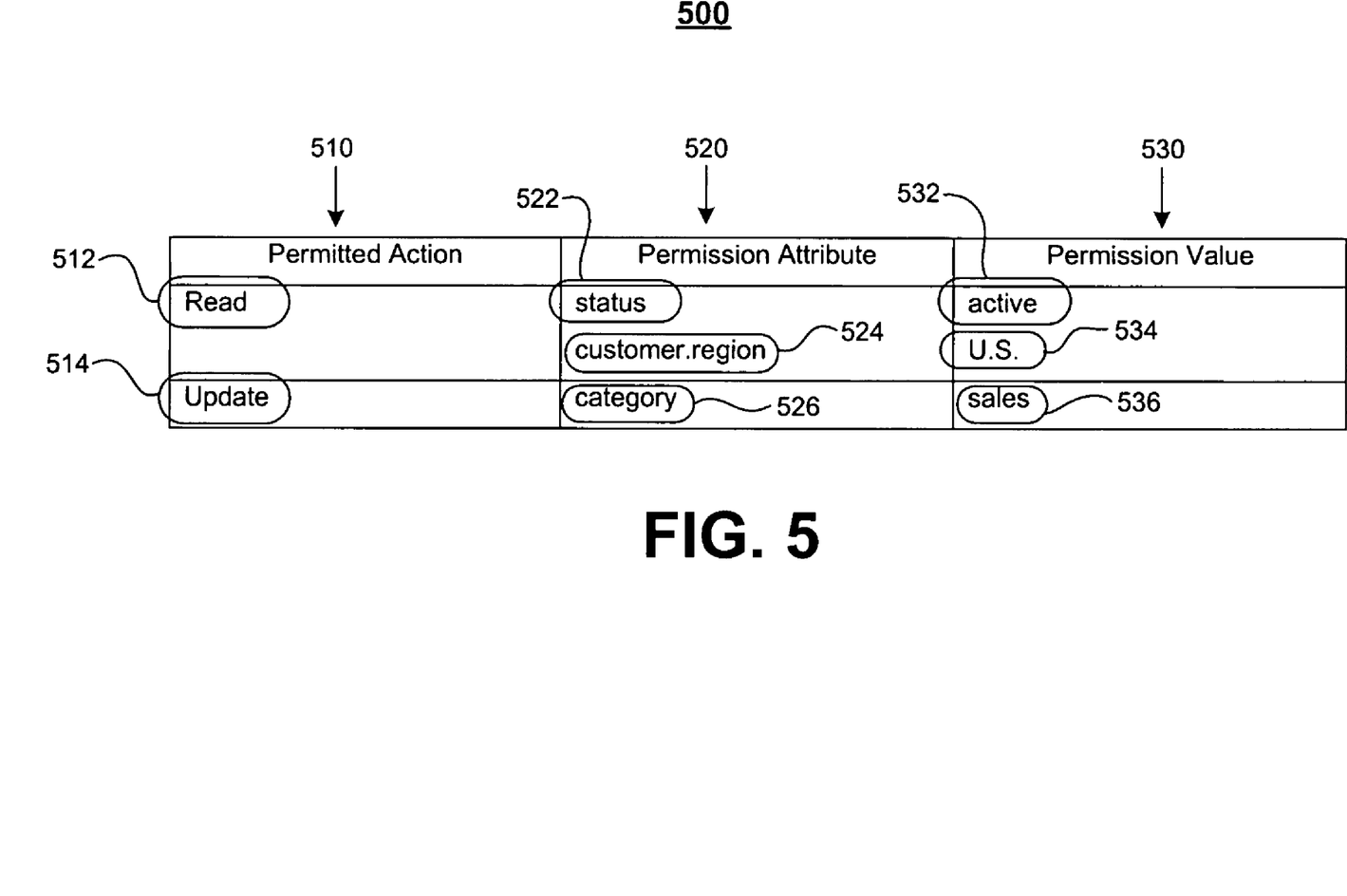
FIG. 5 is a block diagram of an example of a permission filter of a permission object.

Referring also to FIG. 5, an example of a permission filter 500 includes one or more permitted actions 510, each of which is associated with one or more permission attributes 520. Each of the permission attributes 520, in turn, is associated with one or more permission values 530. A permitted action also may be referred to as a permission. In contrast to representation 400 in FIG. 4, the permission filter 500 includes multiple permission attributes 522 and 524 for a permitted action 512. Permission attribute 524 is an attribute that is included in a business object that is referenced by the business object to which a user seeks access, as opposed to being included in the business object itself. This is shown by the conventional notation "customer.region" that indicates an attribute "region" is included in the business object "customer."

More particularly, the permitted action 512 is associated with two permission attributes 522 and 524. For a user to be permitted access to a business object (or a group of attributes in the business object) that is associated with the permission filter 500, the value of the attribute status 522 (here, "active")

in the business object must be consistent with the permission value 532 associated with the attribute status 522 and the value of the region attribute in a customer business object that is related to the business object to which the user seeks access must be consistent with the permission value 534 (here, "U.S.") associated with the attribute 524 (here, "customer.region"). Because both permission attributes 522 and 524 must be satisfied for a user to be permitted access, this may be referred to as an "and" condition. In other implementations, when a permitted action is related to multiple permission attributes, a user may be permitted access to the business object (or a group of attributes in the business object) when only one permission attribute is satisfied. This may be referred to as an "or" condition. In some implementations, the permission values 532, 534 or 536 may be a range of values or a list of enumerated values. The permission values 532, 534 or 536 also may be an expression of logic that is evaluated at runtime, and, when the expression evaluates to a true condition, access is permitted. The permission attribute 514 is associated with only one permission attribute 526 and one permission value 536, each of which are used as previously described.

FIG. 6 illustrates a process 600 for creating a permission object. The process 600 may be performed at design time to define a permission object to be used to check user access at runtime. Generally, a software developer or a system administrator defines a permission object by initiating a computer program capable of performing the process 600, such a process 175 in FIG. 1, and entering appropriate information, as described below.

The user identifies a business object type identifier and a user role to which the permission object applies (step 610). This may be accomplished, for example, by the processor presenting on a display device a list of business object types from which the user selects and presenting a list of user roles from which the user selects.

The user identifies attributes associated with the identified business object type (step 620). The permission object is used to control access to the identified attributes—that is, the attributes identified in step 620 form an attribute group for the permission object being created. In one example, the processor presents on a display device a list of attributes associated with the identified business object type and the user selects from the displayed attributes. In some implementations, a permission object may default to include all attributes of the business object type identified in step 610 so as to make the individual identification of attributes by a user unnecessary.

The user then defines a permission filter for the identified attributes (step 630). In one example using the permission filter 500 in FIG. 5, a list of permitted actions is presented, from which the user selects. For each selected permitted action, the user identifies a permission attribute-permission value pair. In some implementations, a list attributes for the identified business object is displayed, from which the user selects. In addition, business objects may be displayed that are related to the identified business object type, as may be attributes associated with each business object presented. A user is able to select attributes from a business object that is related to the identified business object type for use as a permission attribute in the permission filter.

When the user has completed identifying one or more permitted actions and, for each permitted action, one or more permission attribute-permission value pairs, the processor creates the permission object (step 640) and associates the permission object with a business object type and a user role (step 650). This may be accomplished, for example, by creating a row in a permission object table, as described previously with respect to FIG. 3.

The techniques and concepts described above also may be applicable to permitting a user to access a particular business object when the user relates to a user who is permitted to access the particular business object. For example, a user who seeks to access a particular sales order may be permitted to access the sales order when the user seeking access works for a second user that is permitted to access the sales order. This may be useful to permit a user who is related to a second user—that is, a user works for or with a second user—to access a particular business object created by the second user. In such a case, the permission object indicates that the second user is permitted access to the particular business object and, by extension, the user seeking access is also permitted to access the particular business object.

Although the techniques and concepts described above refer to a business object for a business application operating on a computer system, the applicability of the techniques and concepts is not limited to that particular context. For example, the techniques and concepts may be applicable to other types of data objects and accessing resources identified by a directory structure in which the resources are not associated with a business application. The techniques and concepts may be applicable to controlling access to another type of software, such as real-time software, scientific and engineering software, embedded software, and artificial intelligence software.

A number of implementations of the invention have been described. Nevertheless, it will be understood that various modifications may be made without departing from the spirit and scope of the invention. Accordingly, other implementations are within the scope of the following claims.

What is claimed is:

1. A computer-readable medium included in a storage device and having embodied thereon a computer program configured to determine whether a user is permitted to access requested attributes of a business object when executing a software application of an enterprise information technology system, the medium storing one or more code segments configured to:
   use a permission object to determine whether a user associated with an entry in user information is permitted to access requested attributes of a data object associated with a data object type, wherein:
   the entry in the user information associates the user with a user affiliation,
   the permission object identifies:
      a user affiliation to which the permission object applies,
      a data object type to which the permission object applies such that the data object type identified by the permission object is associated with multiple attributes and each data object having the data object type identified by the permission object is associated with the multiple attributes,
      a permission attribute identifying at least one of the multiple attributes,
      a permission value for the permission attribute, and
      an attribute access group having a subset of attributes of the multiple attributes,
   the subset of attributes being fewer than all of the multiple attributes, wherein the permission object is configured to control access with the permission attribute when the permission attribute is included in the subset of attributes and to control access with the permission attribute when the permission attribute is not included in the subset of attributes, wherein upon determination that:
(1) the user affiliation that is associated with the user is the same user affiliation as the user affiliation to which the permission object applies,
(2) the data object type of the data object is the same as the data object type to which the permission object applies,
(3) a value of the permission attribute associated with the data object is consistent with the permission value for the permission attribute, and
(4) at least one of the requested attributes of the data object corresponds to an attribute included in the attribute access group of the permission object,
the user is permitted to access any of the requested attributes indicated by the subset of attributes and not permitted to access any of the requested attributes not indicated by the subset of attributes, and wherein otherwise the user is denied access to all the requested attributes.

2. The medium of claim 1 wherein the one or more code segments are further configured to permit the user to access at least part of the data object when the value of the attribute of the multiple attributes associated with the data object is the same as the permission value of the permission attribute.

3. The medium of claim 1 wherein the one or more code segments are further configured to permit the user to access at least part of the data object when the value of the attribute of the multiple attributes associated with the data object is within a range specified by the permission value of the permission attribute.

4. The medium of claim 1 wherein the one or more code segments are further configured to permit the user to access at least part of the data object when the value of the attribute of the multiple attributes associated with the data object is one of enumerated values specified by the permission value of the permission attribute.

5. The medium of claim 1 wherein:
the permission object identifies a permitted action, and
the one or more code segments are further configured to permit the user to access at least part of the data object and perform an action on the data object when the action is consistent with the permitted action identified in the permission object.

6. The medium of claim 1 wherein:
the permission object identifies a permitted action, and
the one or more code segments are further configured to permit the user to access the at least part of data object and perform one or more database operations on the data object when the action is consistent with the permitted action identified in the permission object, where the database operations comprise create, read, update and delete.

7. A method for determining whether a user is permitted to access requested attributes of a business object when executing a software application of an enterprise information technology system, the method comprising:
using a permission object included in a storage device to determine whether a user associated with an entry in user information is permitted to access requested attributes of a data object associated with a data object type, wherein:
the entry in the user information associates the user with a user affiliation,
the permission object identifies:
a user affiliation to which the permission object applies,
a data object type to which the permission object applies such that the data object type identified by the permission object is associated with multiple attributes and each data object having the data object type identified by the permission object is associated with the multiple attributes,
a permission attribute identifying at least one of the multiple attributes,
a permission value for the permission attribute, and
an attribute access group having a subset of attributes of the multiple attributes,
the subset of attributes being fewer than all of the multiple attributes, wherein the permission object is configured to control access with the permission attribute when the permission attribute is included in the subset of attributes and to control access with the permission attribute when the permission attribute is not included in the subset of attributes,
wherein upon determination by a processor that
(1) the user affiliation that is associated with the user is the same user affiliation as the user affiliation to which the permission object applies,
(2) the data object type of the data object is the same as the data object type to which the permission object applies,
(3) a value of the permission attribute associated with the data object is consistent with the permission value for the permission attribute, and
(4) at least one of the requested attributes of the data object corresponds to an attribute included in the attribute access group of the permission object,
the user is permitted by the processor to access any of the requested attributes indicated by the subset of attributes, and wherein otherwise the user is denied access to all the requested attributes.

8. The method of claim 7 further comprising permitting the user to access at least part of the data object when the value of the attribute of the multiple attributes associated with the data object is the same as the permission value of the permission attribute.

9. The method of claim 7 further comprising permitting the user to access at least part of the data object when the value of the attribute of the multiple attributes associated with the data object is within a range specified by the permission value of the permission attribute.

10. The method of claim 7 further comprising permitting the user to access at least part of the data object when the value of the attribute of the multiple attributes associated with the data object is one of enumerated values specified by the permission value of the permission attribute.

11. A computer system for determining whether a user is permitted to access requested attributes of a data object when executing a software application of an enterprise information technology system, the system tangibly embodied and comprising:
a processor;
a storage device including a data repository for access control information for software having data objects, each data object
(1) being associated with a data object type having multiple attributes,
(2) having the multiple attributes of the data object type to which the data object is associated, and
(3) having a value associated with each attribute of the multiple attributes,
the data repository including:
user information that associates a user affiliation with a user of the software application, and permission information having multiple permission objects, each permission object identifying: a user affiliation to which the permission object applies, a data object type to which the permission object applies, a permission attribute identifying one of the multiple attributes, a permission value for the permission attribute, and an attribute access group having a subset of attributes of the multiple attributes, the subset of attributes being fewer than all of the multiple attributes, wherein the permission object is configured to control access with the permission attribute when the permission attribute is included in the subset of attributes and to control access with the permission attribute when the permission attribute is not included in the subset of attributes; and an executable software module executed by the processor that causes:
- a comparison of a value of a requested attribute of the multiple attributes of a data object such that the attribute of the multiple attributes corresponds to the permission attribute of a permission object with the permission value of the permission object,
- a comparison of at least one attribute of the data object that the user seeks to access such that the attribute sought to be accessed corresponds to an attribute included in the attribute access group of the permission object, and
- an indication that a user is permitted to access any of the requested attributes indicated by the subset of attributes and not permitted to access any of the requested attributes not indicated by the subset of attributes when
  - (1) the value of the attribute of the data object is consistent with the permission value of the permission object, and
  - (2) at least one of the requested attributes of the data object corresponds to an attribute included in the attribute access group of the permission object, and
  wherein otherwise the user is denied access to all the requested attributes.

12. The system of claim 11 wherein the executable software module causes an indication that a user is permitted to access the attribute sought to be accessed when the value of the attribute of the data object is the same as the permission value of the permission attribute.

13. The system of claim 11 wherein the executable software module causes an indication that a user is permitted to access the attribute sought to be accessed when the value of the attribute of the data object is within a range specified by the permission value of the permission attribute.

14. The system of claim 11 wherein the executable software module causes an indication that a user is permitted to access the attribute sought to be accessed when the value of the attribute of the data object is one of enumerated values specified by the permission value of the permission attribute.

15. The system of claim 11 wherein:
the permission object identifies a permitted action, and
the executable software module causes an indication that a user is permitted to access the attribute sought to be accessed and perform an action on the attribute sought to be accessed when the action is consistent with the permitted action identified in the permission object.

* * * * *

UNITED STATES PATENT AND TRADEMARK OFFICE
CERTIFICATE OF CORRECTION

PATENT NO. : 7,650,644 B2  Page 1 of 1
APPLICATION NO. : 10/720447
DATED : January 19, 2010
INVENTOR(S) : Cheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

Twenty-third Day of November, 2010

David J. Kappos
*Director of the United States Patent and Trademark Office*